United States Patent [19]

Bickl et al.

[11] 3,732,461
[45] May 8, 1973

[54] UNBALANCE DETECTION CIRCUITS FOR PLURAL PARALLEL LAMP SYSTEMS

[75] Inventors: Horst Bickl, Munich; Joachim Lange, Unterhaching; Heinrich Neumann, Munich; Bernhard Goschin, Munich; Alois Rieder, Munich, all of Germany

[73] Assignee: Agfa-Gevaert Aktiengesellschaft, Munich, Germany

[22] Filed: Oct. 16, 1970

[21] Appl. No.: 81,267

[30] Foreign Application Priority Data

Nov. 25, 1969 Germany.................P 19 59 016.0

[52] U.S. Cl. ...............315/130, 315/136, 315/192, 315/324, 355/70
[51] Int. Cl...........................H01j 1/60, H05b 37/03
[58] Field of Search......................355/69, 70, 71; 240/1.3, 2 C; 315/120, 121, 127, 130, 136, 192, 312, 324

[56] References Cited

UNITED STATES PATENTS

| | | | |
|---|---|---|---|
| 3,342,100 | 9/1967 | Maloney et al. | 355/71 X |
| 2,403,711 | 7/1946 | Egan | 355/70 X |
| 2,481,694 | 9/1949 | Schubert et al. | 355/70 X |
| 2,676,513 | 4/1954 | Engstrom | 355/69 X |
| 2,984,150 | 5/1961 | Osgood, Jr. | 355/70 X |

Primary Examiner—Roy Lake
Assistant Examiner—Siegfried H. Grimm
Attorney—Arthur O. Klein

[57] ABSTRACT

An illumination installation, in particular for lighting a transparent table or support in step-by-step microfilm camera apparatus, such installation providing for the even illumination of a condenser of an image projecting apparatus. A plurality of lamps are distributed over the surface to be illuminated, the lamps being divided into at least two groups. In certain embodiments the current supply circuit for feeding the lamps is divided into two parallel circuits, each of which contains a resistor, there being an amplifier which scans the voltage drop at the resistors and operates an optical and/or acoustical signal transmitter upon an unbalance of the voltage drops through the respective resistors.

In another embodiment, the feeding of current to the lamps is divided into at least two parallel circuits, the passage of current through which is compared by a compensatory current transformer which controls a relay controlling an optical and/or acoustic signal transmitter and/or a switch controlling a further apparatus controlling circuit.

2 Claims, 3 Drawing Figures

UNBALANCE DETECTION CIRCUITS FOR PLURAL PARALLEL LAMP SYSTEMS

This invention concerns an illumination installation, in particular a transparent table or support for microfilm step-by-step cameras, over the area of which several lamps are spaced for the even illumination of a condenser of a projection device.

The transparency folios to be filmed with microfilm step-by-step cameras, are placed on an illumination box, the so-called transparent table, during the exposure. In order to produce an even background density on the film, the light density of the surface must be adjusted in accordance to the decrease of light of the object photographed and in accordance to other fixed differences in the light circuit of the image-forming path of the rays. This happens, in general, with many of the single illumination lamps provided for the transparent table, such lamps being adjustable and electrically connected to several lamp groups. The single lamp groups will in general be switched on or off in sections at the filming of transparencies of different formats, with objectives of varied focal lengths, and with different reduction factors.

The failure of a single lamp or even a whole group of lamps as a rule is not ascertainable by observation of the light surface of the transparent illuminating table.

The exact illumination of the film window is considerably disturbed by the unlighted condition of one or several lamps, so that films exposed under such conditions may become unusable. It is therefore essential to detect and to signal through a control apparatus the lack of an illumination lamp.

Galvanometer lamps, for example, are in use as control apparati; these are switched in line with the receiver, that is, the bank of illuminating lamps. This signal system can be applied to only a very limited number of lamps. In any case, it leads to a relatively costly construction which is hard to monitor, and is subject to interference, in particular in case of voltage-regulated lamps. It is further known that optical signal transmitters may be used, which are controlled by metering elements that are connected to each of the receiver circuits. In such systems, a large number of signal transmitters is essential; this makes the control system relatively costly and difficult to monitor and maintain. In view of the aforementioned regulation shifts, the signal transmitters must be sensitive enough to react only to the complete cessation of function of one lamp. Changes in illumination strength because of changes due to heat resistance of a single lamp therefore should not be indicated. Also, the on-and-off switching of receivers is possible only by replacing the receiver with a commensurate resistor.

In accordance with this invention, the lamps are split up into at least two lamps or receiver groups, and a comparative switching mechanism is provided for the current flowing through these receiver circuits. As a result, all lamp groups can be controlled by a single signal control device. Regulatory shifts do not enter into the measured result, so that the sensitivity of the signal installation can be increased, if desired. Also, an on-and-off switching of the lamps is possible without the appearance of greater losses in efficiency as is more fully shown in the following description.

In line with the carrying out of this invention, the feeding of electricity to the lamps is further divided into two parallel electric circuits, each of which contains a variable resistor and a difference amplifier which controls an optical and/or acoustic signal transmitter. Preferably, in addition, there is provided a switch for the simultaneous, parallel switching-on of lamp groups.

In accordance with other forms of execution of the invention, at least two of the receiver groups are switched in line and are positioned parallel to a line of measurement resistors. Both of these rows are connected with a glow lamp. The control of several rows of lamps via a single glow lamp is possible because several receiver rows with equal resistance relation are switched parallel, and all glow lamps are connected to a diode. Also, with this construction, on-and-off switching of lamp groups for the purpose of format reversal is possible, if switches are coupled together.

In accordance with a further embodiment, the supply of current to the lamps is apportioned into at least two parallel circuits, which control an optical and/or acoustic signal transmitter. With this measure, a symmetrical lamp failure can be established, if the sphere of the lamp is divided into asymmetrical receiver groups. Preferably, this system includes a transformer functioning as a compensatory current transformer. A relay and a transistor intensifier may be switched in circuit with this current transformer.

In this drawing, several examples of the invention are illustrated:

Figure 1:
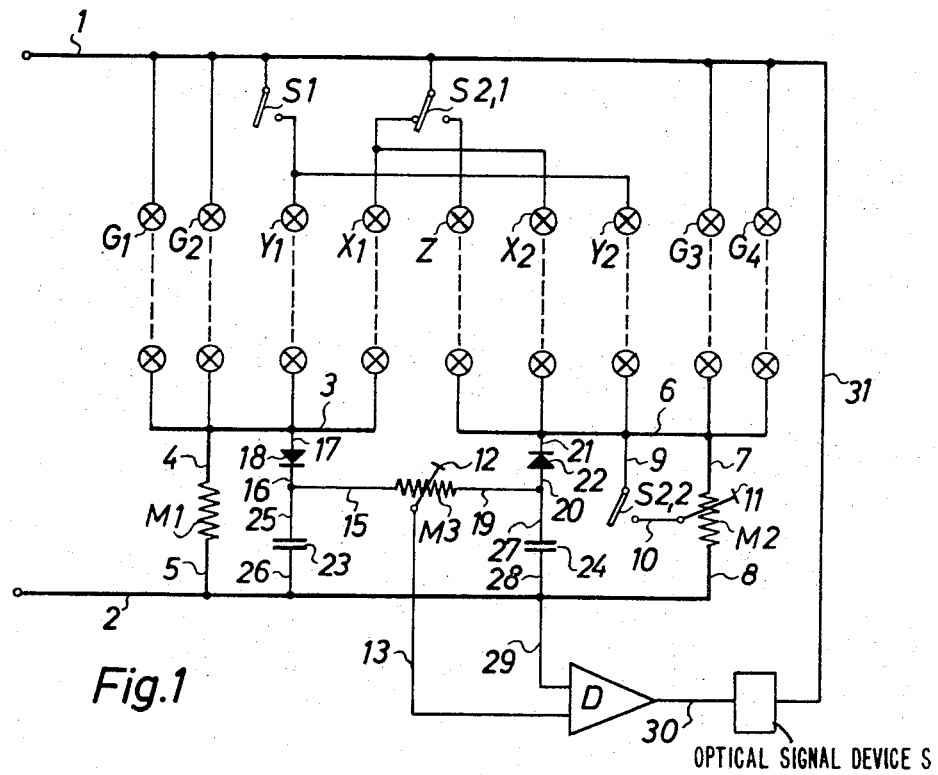
FIG. 1 is a wiring diagram of a system in which there is a comparison of voltage between two parallely switched lamp groups.

In FIG. 1, between two main circuit wires 1 and 2 connected to a suitable source of alternating current (not shown) are positioned serially connected lamp rows G1-4, Y 1 and 2, X1 and 2 and Z. The rows of lamps each contain ten lamps and serve for the illumination of several areas of a transparent table. The lamp rows G1, G2, Y1, X1 are connected to a common conductor 3 and are connected with main circuit wire 2 via wire 4, a resistor M1, and a wire 5. The rows of lamps G 3, G 4, X2, Y 2 and Z are connected to a common wire 6, which is connected to wire 2 through a wire 7, a variable resistor M2, and a wire 8.

The precision measuring resistors M1 and M2 (when suitably adjusted) are of equal size, so that when both lamp groups connected to their respective resistance show equal total resistances, there is no voltage difference between wires 3 and 6. This is the case, if, as shown in FIG. 1, both lamp rows X 1 and X 2, consisting of similar lamps, are simultaneously connected to wires 1 and 2 through switch S 2.1, the asymmetrically disposed lamp row Z is switched off, and both lamp rows Y 1 and Y 2 are switched off through switch S 1. With simultaneous switching in of lamp rows Y 1 and Y 2 by switch S 1, or switching off of lamp rows X 1 and X 2 through switch S 2.1, no change in voltage equilibrium takes place. The switching in of the asymmetrically placed lamp row Z through switch S 2.1, however, causes the appearance of a voltage difference between wires 3 and 6. In order to avoid this, switch S 2.1 is coupled mechanically with switch S 2.2, which is connected through conductors 9 and 10 to an adjustable contact 11 of variable resistor M 2, contact 11 permitting variable resistor M 2 to be by-passed to a varying degree, that is, to function as a potentiometer.

By use of switch S 1, S 2.1, and S 2.2 it is also possible to switch on and off selected lamp groups with the change of the format of the object being photographed, without effecting a change in the voltage stabilization of conductors 3 and 6. This voltage stabilization remains in tact even when the illumination of the lamp is adjusted through large alterations in the supply voltage. On the other hand, an immediate voltage difference appears at wires 3 and 6, if, in either electric supply circuit for the lamps, a lamp ceases to function, or changes its resistance due to heat. To ascertain this voltage difference, a further variable resistor M 3 is employed, the adjustable contact 12 of which is connected to one input terminal of amplifier D via wire 13. The variable resistor M 3 is connected to wire 3 through wires 15, 16 and 17 with the interposition of a diode 18 between 16 and 17, wire 6 through a wire 19, wire 20, a diode 22, and a wire 21. The diodes 18 and 22 are oppositely disposed, as shown, to smooth the rectified current, the terminals of variable resistor M 3 are also connected to main circuit wire 2 via wires 25 to 28 with the interposition of condenser 23 and 24, respectively, as shown. A further wire 29 connects wire 2 to the other input terminal of amplifier D.

As soon as a voltage differential occurs between wires 3 and 6, a voltage will be picked up at variable resistor G 3: such voltage is amplified in amplifier D and conducted to an optical or acoustical signal device S via wire 30. The other terminal of device 3 is connected to wire 1 by wire 31. With the use of a sensitive amplifier D the variable resistors M 1 and M 2 may be of correspondingly low resistance, so that only an insignificant loss of function occurs. After the exchange of all or several lamps should the output impedance of the new lamps not correspond to the exact, output impedance of both circuits, a correspondingly changed voltage may be provided by adjustment of contact 12 of resistor M 3 and by adjustment of the gain of amplifier D.

Figure 2:
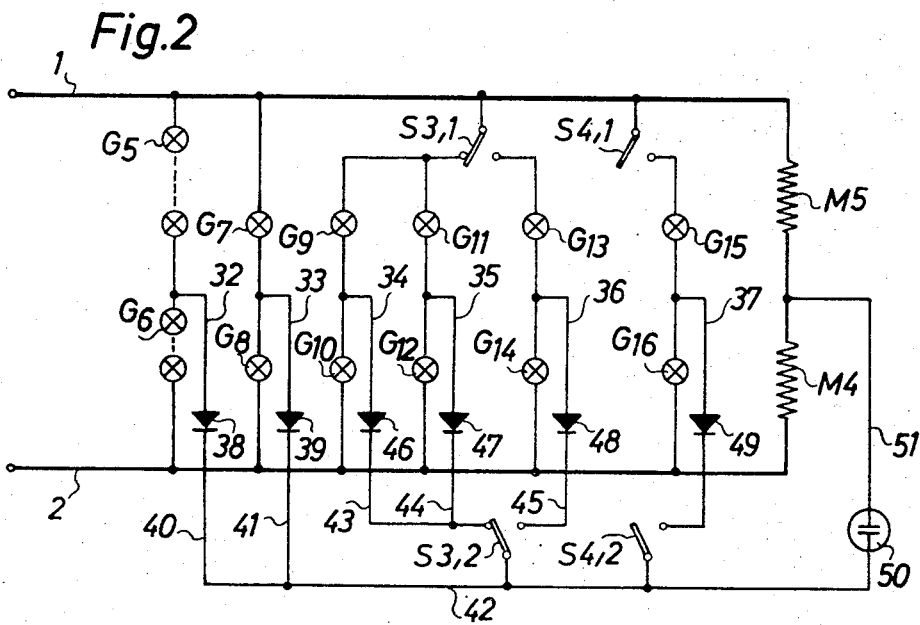
FIG. 2 shows a system in which there is a comparison of voltage between lamp groups and a row of resistors via a glow lamp.

In accordance with FIG. 2, rows of series connected lamps G 5 to G 16 are located between supply wires 1 and 2. The rows of series connected lamps are each divided into 2 symmetrical halves which are connected at junctions between both halves by respective wires 32 to 37. The rows of series connected lamps G 9 to G 14 are connected to wire 1 through switch S 3.1; the rows of lamps G 15 and G 16 are connected to wire 1 through switch S 4.1. Wires 32 and 33 are connected to a wire 42 by means of diode 38 and 39, respectively, through wires 40 and 41. Further wires 43 and 45 connect wires 34 and 36, respectively, through diodes 46, 48, respectively, and a switch S 3.2 to wire 42. Further, wire 37 is connected to wire 42 through a diode 49 and a switch S 4.2.

One terminal of glow lamp 50 is connected to wire 42; the other terminal is connected by wire 51 to a junction between two series connected equal resistors M 4 and M 5 connected across wires 1 and 2. Resistors M 4 and M 5 may be made adjustable, if desired. Since both lamp rows as well as resistors M 4 and M 5 have an equal resistance ratio, both wires 32 and 37, as well as wire 51 in normal operation operate at equal potential. Glow lamp 50 therefore is not fed any current under such condition. If, in any of the aforementioned of connected lamps, one lamp ceases to function, the corresponding point of attachment remains under the complete potential of the wire connected to a row of lamps as yet unaffected, while wire 51 connected between resistors M 4 and M 5 remains at its original potential.

Assuming a voltage supply of 220 V, a considerable difference in potential occurs between wire 51, connected between M 4 and M 5, and wire 42. Such difference in potential may amount to 110 V, which causes glow lamp 50, which may initially light at 70 V, to light up. Diodes 38, 39, 46, and 49 prevent current from travelling over the unaffected connecting points, which remain at the original potential, rather than through the glow lamp 50. Lamp 50, however, will not be lighted by fluctuations in voltage between wires 1 and 2. Because of the glow lamp using very little current, the resistors M 4 and M 5 have high resistance values; the system therefore consumes very little electrical energy.

The on and off switching of any lamp groups is possible without causing glow lamp 50 to light up, if at the same time the connection to each variable resistor to glow lamp 50 is interrupted via switches S 3.1, S 3.2, S 4.1, and S 4.2, the movable contacts of which are mechanically interconnected so that they operate in unison.

Figure 3:
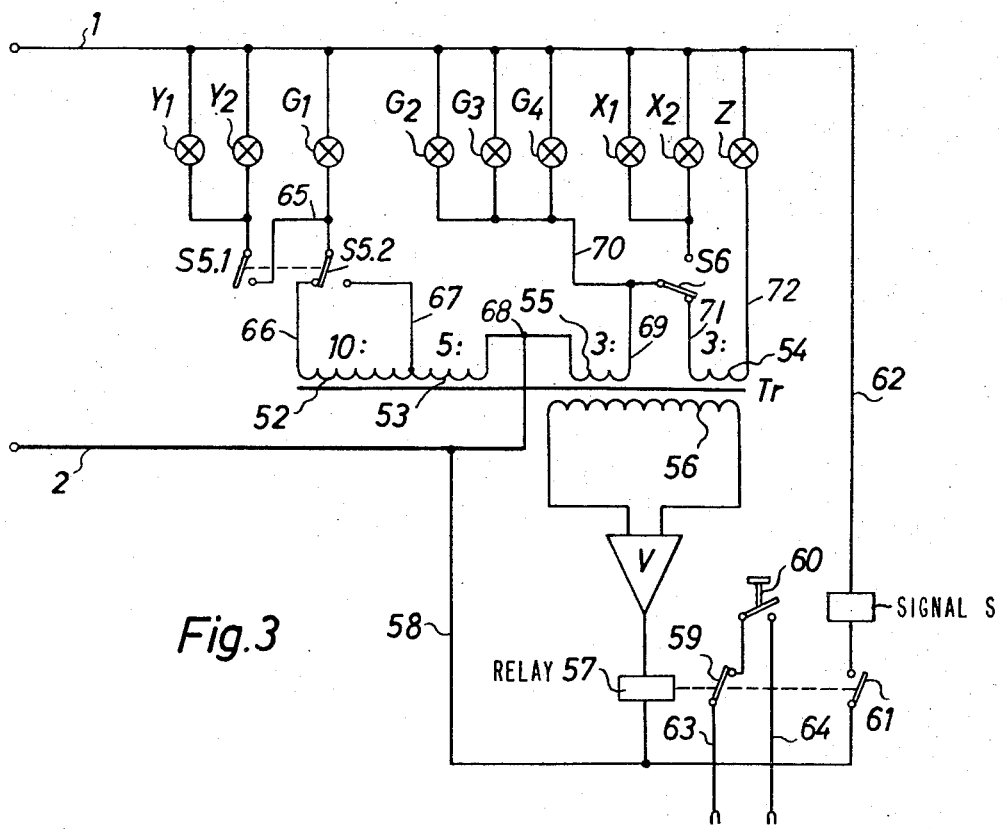
FIG. 3 shows a system in which there is a comparison of current via a compensatory current transformer.

In the system of FIG. 3, one terminal of each of lamps Y1, Y2, G1 to G4, X1, X2, and Z is connected to wire 1. The other terminals of the lamps are selectively connected in manners to be described to various portions 52–55 of the low resistance primary winding of a compensatory current transformer Tr. Such transformer has a magnetic core, as shown, and a secondary winding 56. Windings 52, 53, 54, and 55, have numbers of turns in the ratio 10 : 5 : 3 : 3. The second terminals of parallel connected lamps Y1, Y2 are connected to terminal of an on-off switch S 5.1, the other terminal of switch S 5.1 being connected through wire 65 to the second terminal of lamp G1, such second terminal being connected to the first terminal of a second, two-position switch S 5.2 which is mechanically interconnected with switch S 5.1 as shown. One second terminal of switch S 5.2 is connected by a wire 66 to one end of the primary winding portion 52, the other second terminal of switch S 5.2 being connected by a wire 67 to the junction between primary winding portions.

The junction 68 between primary winding portions 53 and 55 is connected to main wire 2. The second terminals of lamps G2, G3, and G4 are connected to a wire 70 which leads to a first, single terminal of a two-position switch S6. The second end of primary winding portion 55 is connected to wire 70 by a wire 69. One second terminal of switch S6 is connected to the second terminal of parallel connected lamps X1, X2. The other second terminal of switch S6 is connected by wire 71 to the first end of primary winding portion 54; the second end of winding portion 54 is connected by a wire 72 to the second terminal of lamp Z.

The secondary winding 56 of the transformer Tr has the ends thereof connected to the input of an amplifier V the output of which is connected to the coil of a relay 57. A signal device S is connected between the other terminal of switch 61 and a wire 62 which is connected to main wire 1. The relay 57 controls a second switch 59, the movable contactors of switches 59 and 61 being mechanically connected as shown so that when switch 59 is closed, switch 61 is open, and vice-versa. Switch 59 is interposed in a further, separate circuit having leads 63, 64 in which a further, manually-operated external switch 60 is interposed in series with switch 59. The further circuit 63, 59, 60, and 64 may be employed to control another mechanism (not shown) of the apparatus with which the device of the invention is associated, or may be a part of the current supply circuit powering leads 1 and 2, whereby all of the lamps are shut off when a current unbalance between the various groups of lamps occurs.

The control system of FIG. 3 functions as follows:

The switches S 5.1, S 5.2 selectively connect the lamps Y1, Y2 with all of the turns of windings 52, 53 of transformer Tr, or lamps Y1, Y2, and G1 with coil 52 of transformer Tr. The further switch S6 selectively connects lamp Z with the two series connected transformer windings 54 and 55, or lamps X1 and X2 with winding 55. Lamps G2 to G4 are constantly connected to winding 55. Series connected windings 52 and 53, on the one hand, and series connected windings 54 and 55, on the other hand, are, in effect, connected to wire 2 in the opposite direction, so that their reactions relative to the secondary winding 56 of transformer Tr oppose each other; no current flows in transformer secondary winding 56, when all windings are subjected to an equal number of ampere turns and the resulting flux in the core of the transformer Tr is zero. This is always the case if the same current flows through all lamps.

Both lamp switches S 5.1, S 5.2, on the one hand, and S6, on the other, can be used independently of each other, without affecting the evenness of the number of ampere winding turns at windings 52, 53, 54, and 55. Also regulatory fluctuations of the current supply source do not enter into such proportionalities. On the other hand, as can be easily proved by simple computation, the constancy will be interrupted in the unlikely instance of cessation of lamp functions in different lamp groups occurs, due to the asymmetrical division of the number of ampere winding turns. And lastly, the transformer Tr is constructed in such a way that its low-resistance windings are positioned in the lamp circuits, in order to minimize current consumption and to cause a relatively large change in voltage with only a minor shift in current.

If the resistance of one of the lamps is altered, or if one of the lamps ceases to function, a current flows in secondary winding 56; such current is intensified by amplifier V And conducted to the coil of relay 57. Switches 59 and 61 are thereupon closed, signal S is actuated, and auxiliary circuit 63, 59, 60, and 64 is energized. When the current flow in secondary winding returns to zero, upon the correction of the condition of uneven lighting, signal S is de-energized and the auxiliary circuit is opened.

Although the invention is illustrated and described with reference to a plurality of embodiments thereof, it is to be expressly understood that it is in no way limited to the disclosure of such a plurality of preferred embodiments, but is capable of numerous modifications within the scope of the appended claims.

What is claimed is:

1. In a uniform illumination system:
   a source of energizing voltage;
   three first paths each comprising a plurality of serially connected lamps, each first path having corresponding first and second terminals;
   a transformer having a secondary winding, and a primary winding that includes first and second serially connected portions respectively wound in phase opposition between third and fourth terminals, the second portion having an intermediate tap;
   means for connecting the first terminal of each first path to one terminal of the source;
   means for connecting the junction of the first and second portions to the other terminal of the source;
   means for connecting the second terminal of one of the first paths to the third terminal of the primary winding;
   switching means operable in a first position to connect the second terminals of each of the remaining first paths to the intermediate tap of the second portion and operable in a second position to connect the second terminal of only one of such remaining first paths to the fourth terminal of the primary winding; and
   means coupled to the secondary winding for generating an indication when the secondary winding exhibits an output.

2. A system as defined in claim 1, in which the resistance of each of the first and second portions is low relative to that of each first path.

* * * * *